(12) United States Patent
Raeber et al.

(10) Patent No.: US 10,387,537 B1
(45) Date of Patent: Aug. 20, 2019

(54) PRESENTATION OF INTRODUCTORY CONTENT

(71) Applicant: Amazon Technologies, Inc., Reno, NV (US)

(72) Inventors: Eric Peter Raeber, Redwood City, CA (US); Daniel Peter Cox, Sunnyvale, CA (US); Jaee Patwardhan, Sunnyvale, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 517 days.

(21) Appl. No.: 13/717,833

(22) Filed: Dec. 18, 2012

(51) Int. Cl.
*G06F 17/21* (2006.01)

(52) U.S. Cl.
CPC .................... *G06F 17/21* (2013.01)

(58) Field of Classification Search
CPC ....... G06F 21/10; G06F 3/0236; G06Q 30/02; H04N 7/17318
USPC ............. 715/700, 201; 725/32, 34; 375/211; 455/433; 709/218; 705/59, 14.42
See application file for complete search history.

(56) References Cited

U.S. PATENT DOCUMENTS

| | | | | |
|---|---|---|---|---|
| 7,324,736 B2* | 1/2008 | Wells | | 386/343 |
| 7,706,740 B2* | 4/2010 | Collins et al. | | 455/3.01 |
| 8,352,990 B2* | 1/2013 | Higgins et al. | | 725/80 |
| 8,468,056 B1* | 6/2013 | Chalawsky | | H04N 21/2547 705/14.41 |
| 8,650,603 B2* | 2/2014 | Doets et al. | | 725/94 |
| 2002/0178443 A1* | 11/2002 | Ishii | | H04N 5/76 725/22 |
| 2004/0078822 A1* | 4/2004 | Breen | | H04N 7/17318 725/86 |
| 2004/0107435 A1* | 6/2004 | Anzai | | H04N 7/17318 725/35 |
| 2004/0205477 A1* | 10/2004 | Lin | | G06F 17/30017 715/202 |
| 2005/0005242 A1* | 1/2005 | Hoyle | | G06F 8/60 715/745 |
| 2005/0108095 A1* | 5/2005 | Perlmutter | | G06Q 30/02 705/14.53 |
| 2005/0286639 A1* | 12/2005 | Aggarwal | | H04N 19/61 375/240.25 |
| 2006/0013567 A1* | 1/2006 | Wakui | | H04N 5/2351 386/224 |
| 2007/0043616 A1* | 2/2007 | Kutaragi | | A63F 13/12 705/14.68 |
| 2007/0113243 A1* | 5/2007 | Brey | | 725/32 |
| 2007/0168294 A1* | 7/2007 | Tsurukawa | | 705/59 |
| 2007/0250390 A1* | 10/2007 | Lee | | G06Q 30/02 705/14.51 |
| 2007/0266305 A1* | 11/2007 | Cong et al. | | 715/500.1 |
| 2007/0274376 A1* | 11/2007 | Jang et al. | | 375/211 |

(Continued)

*Primary Examiner* — Li P Sun
*Assistant Examiner* — Qi Wan
(74) *Attorney, Agent, or Firm* — Lindauer Law, PLLC

(57) ABSTRACT

Described herein are systems and methods for providing introductory content before presentation of primary content. The introductory content engages the user's attention while the primary content is prepared for presentation and may improve the user experience. User input responsive to the introductory content may be used to indicate a point of interest within the primary content. Subsequent presentation of the primary content may begin at the point of interest or a point based at least in part on the point of interest.

20 Claims, 12 Drawing Sheets

(56) References Cited

U.S. PATENT DOCUMENTS

| | | | |
|---|---|---|---|
| 2007/0276926 A1* | 11/2007 | LaJoie | G06F 21/10 709/219 |
| 2008/0065722 A1* | 3/2008 | Brodersen | G06F 3/0236 709/203 |
| 2008/0076414 A1* | 3/2008 | Kharebov et al. | 455/433 |
| 2008/0235351 A1* | 9/2008 | Banga et al. | 709/218 |
| 2009/0106442 A1* | 4/2009 | Liu | H04L 29/06027 709/231 |
| 2009/0112617 A1* | 4/2009 | Jung | G06F 19/3418 705/2 |
| 2009/0259956 A1* | 10/2009 | Barsook | H04N 5/44513 715/764 |
| 2009/0319375 A1* | 12/2009 | Dharmaji | 705/14.64 |
| 2010/0086277 A1* | 4/2010 | Craner | H04N 5/76 386/278 |
| 2012/0290393 A1* | 11/2012 | Johansson | G06Q 30/0269 705/14.55 |
| 2013/0080579 A1* | 3/2013 | Gordon et al. | 709/217 |
| 2013/0097630 A1* | 4/2013 | Rodriguez | 725/32 |
| 2013/0276022 A1* | 10/2013 | Tidwell | 725/34 |
| 2014/0040760 A1* | 2/2014 | Randell | G06F 17/30029 715/745 |

\* cited by examiner

PRESENTATION OF INTRODUCTORY CONTENT

BACKGROUND

A wide variety of content is available for download or streaming from content providers. To maintain the rights of the content creators, distributors and others, the content may be protected using one or more digital rights management (DRM) schemes. DRM's protection of the content may encourage content providers to make content available for distribution online. However, implementation of DRM may result in delays to presentation of the content which are apparent to the users. For example, the user may experience about five seconds of initial delay before presentation of DRM-protected content begins. Even without DRM, delays may be encountered to allow time for buffering content, configuring the presentation device, and so forth. These delays may result in an unacceptable user experience.

Figure 1:
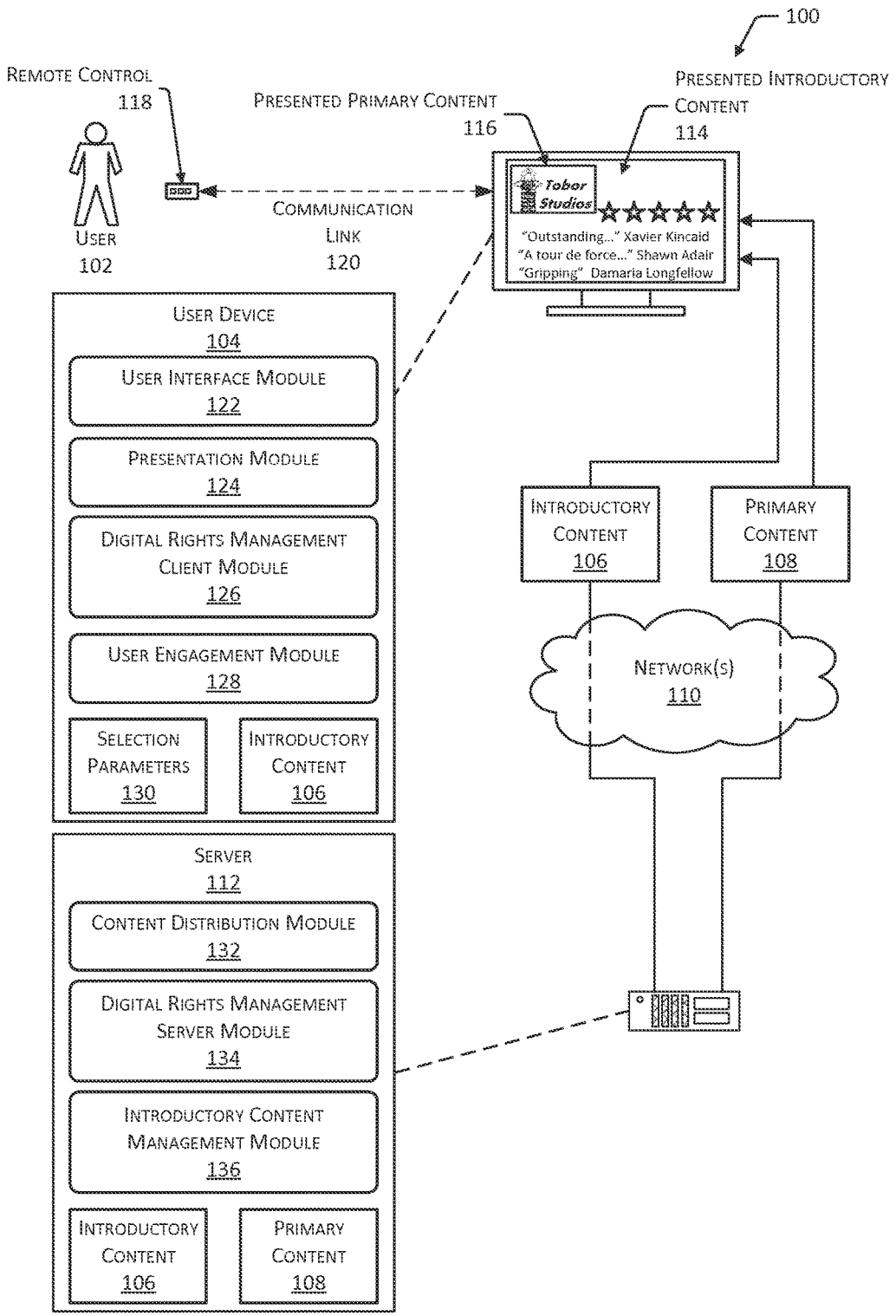
FIG. 1 is an illustrative system for presentation of introductory content and primary content.

Certain implementations and embodiments will now be described more fully below with reference to the accompanying figures, in which various aspects are shown. However, various aspects may be implemented in many different forms and should not be construed as limited to the implementations set forth herein. Like reference numbers in the figures refer to like elements throughout.

DETAILED DESCRIPTION

A wide variety of content is available for download or streaming from content providers. This content may include eBooks, audiobooks, television shows, movies, applications, and so forth. Users have come to expect devices to respond very quickly, and perceived delays in action may result in an adverse user experience. However, some functions such as retrieving data across a network from a server, establishing a secured digital rights management session, and so forth, may introduce delays which are perceptible to the user.

Described in this disclosure are methods and systems for providing introductory content to the user while primary content is made available for presentation. The introductory content may act to engage the attention of the user. As a result, the user may have an improved user experience.

The introductory content may be one or more of text, audio, video, animation, interactive application, and so forth. In some implementations the introductory content may be related to, or otherwise associated with, the primary content. For example, the introductory content may include a slideshow of still images taken from the primary content, text trivia about the primary content, and so forth. The primary content is the content of particular interest to the user, such as the movie selected to watch, the audiobook selected to listen to, and so forth.

One or more pieces of introductory content may be determined for presentation based on one or more selection parameters. These selection parameters may include environmental factors, user data, content metadata associated with one or both of the primary content or the introductory content, and so forth.

The introductory content may be presented while the primary content is being prepared or setup for presentation. For example, while the user device is being configured to decrypt the primary content using a digital rights management scheme, the introductory content may present photos from a photo album, provide trivia associated with the primary content, and so forth. User input may also be used to discontinue presentation of the introductory content, or switch to another piece of introductory content. For example, the user may not wish to see the photo album, and so may press a button which results in selection of another piece of introductory content, such as trivia.

In one implementation presentation of the introductory content may be discontinued when the primary content is available for presentation. In another implementation the presentation of the introductory content may continue contemporaneously with presentation of the primary content. For example, the introductory content may be presented in one portion of a display frame while the primary content is presented in another. User input, such as the user pressing a button on a remote control, may be used to initiate transition from this dual presentation to single presentation of the primary content.

By monitoring the point in the presentation of the primary content at which the user input is received, a point of interest in the primary content may be determined. For example, the primary content may include several minutes of studio logos, production company vanity cards, and so forth at the beginning before the content of interest to the user begins. With the dual presentation, the introductory content remains presented, providing something engaging for the user to consume. When the portion of the primary content which is of interest to the user begins, the user may press a button on the remote which removes the introductory content and leaves the primary content in the full screen. The point in the primary content at which the user presses the button may indicate the start of an opening scene in the television show, movie, and so forth. The points of interest as acquired from many users accessing the same or similar pieces of content may be acquired and used to generate a definitive point of interest associated with the primary content. The definitive point of interest may be used such that users may press a button or select an option to automatically "skip" or jump to the point in the primary content at which the definitive point of interest occurs, resulting in reduced delay in presenting the portion of the primary content which is of interest to the user.

Illustrative System

FIG. 1 is an illustrative system 100 for presentation of introductory content and primary content. A user 102 is depicted with a user device 104 configured to present content for consumption. While a single user 102 is shown, a group of users 102(U) may consume content at a given time, such as where multiple users 102(U) are watching or listening to the presented content together.

The user device 104 may include televisions, table computers, personal computers, electronic book readers, gaming consoles, in-vehicle entertainment systems, portable media players, and so forth. The user device 104 depicted may comprise a display and speakers.

In some implementations the user device 104 may connect to other user devices 104 with one or more device interfaces. The device interface may be a High Definition Multimedia Interface ("HDMI") as promulgated by HDMI Licensing LLC, TOSLINK as promulgated by Toshiba Corp., Ethernet, analog video, analog audio, IEEE 1394 as promulgated by the Institute for Electrical and Electronics Engineers, Universal Serial Bus as promulgated by the USB Implementers Forum, Digital Visual Interface ("DVI") as promulgated by the Digital Display Working Group, video graphics array ("VGA"), DisplayPort as promulgated by the Video Electronics Standards Association ("VESA"), Intel Wireless Display ("Wi-Di"), Wi-Fi Direct, Bluetooth as promulgated by the Bluetooth Special Interest Group, ZigBee as promulgated by the ZigBee Alliance, and so forth.

The user device 104 may receive introductory content 106, primary content 108, or both, using one or more networks 110 coupled to one or more servers 112. Content including the introductory content 106 and the primary content 108 may be visual, audible, haptic, and so forth.

The introductory content 106 may be one or more of text, audio, video, animation, interactive application, and so forth. The introductory content 106 may be provided by the one or more servers 112, previously stored on the user device 104, or received from another device. For example, the user 102 may transfer family photos from a digital camera to the user device 104. Continuing the example, the family photos may be used as introductory content 106. The introductory content 106 is discussed in more detail below with regard to FIG. 3.

The introductory content 106 may be retrieved from the server 112 at the time of presentation or may be retrieved in advance and stored for use. For example, the introductory content 106 associated with the primary content 108 in the user's 102 watch list or queue may be pre-cached on the user device 104. In some implementations the introductory content 106 may, but need not always, be associated with the primary content 108.

The primary content 108 is the content of particular interest to the user 102. This may include a movie selected to watch, an audiobook selected to listen to, a slideshow for presentation, a game to play, and so forth. The primary content 108 may include some portion of the content which may not be of direct or significant interest to the user. For example, where the primary content 108 includes a game or movie some lead-in content such as studio logos, production company vanity cards, and so forth may be included.

The networks 110 may include one or more public networks such as the Internet, private networks, or a combination of both. The user device 104, the server 112, and other devices may couple to the networks 110 such that data may be exchanged between these devices.

The user device 104 is configured to output the introductory content 106 as presented introductory content 114 and output the primary content 108 as presented primary content 116. In some implementations the presented introductory content 114 and the presented primary content 116 may be provided contemporaneously. In the example illustrated here, the introductory content 106 comprises information about ratings and reviews associated with the primary content 108 requested by the user 102. The presented introductory content 114 in this illustration is presented using most of a display frame while the presented primary content 116, once available, is depicted as a window inset in the display frame. With this presentation, attention of the user 102 may be engaged by the presented introductory content 114 while also seeing the presented primary content 116.

The user 102 may provide input using controls available on the user device 104, or an external device such as a remote control 118. The remote control 118 may serve as an input device or input/output device for the user device 104. For example, the remote control 118 may include one or more of a touch sensor, button, accelerometer, gyroscope, camera, microphone, speaker, haptic output device, and so forth. The communication link 120 may be optical, radio frequency, acoustic, and so forth. In one implementation the communication link 120 may use a personal area network interface, such as one compliant with the Bluetooth specification. The communication link 120 may also use local area network interfaces, such as one compliant with the Wi-Fi standards set forth by the Wi-Fi Alliance. In some implementations the remote control 118 may comprise another device such as a smartphone, tablet computer, and so forth which is communicatively coupled to the user device 104 using a personal area network, local area network, wide area network, and so forth.

The user 102 may provide user input, such as activating a control on the remote control 118 which is configured to discontinue presentation of the introductory content 106 and initiate or continue presentation of the primary content 108. For example, the user 102 may see from the presented primary content 116 that an opening scene of the movie has started, and may activate the control to show the move in full screen.

A user interface module 122 is configured to provide a user interface to the user 102 and accept inputs responsive to the user interface. These inputs may include button presses, gestures, speech, and so forth. The user interface may include one or more visual, audible, or haptic elements. For example, the user interface may be configured to provide a graphical user interface using the display which includes control selection of the primary content 108, allows interaction with the introductory content 106, and so forth.

A presentation module 124 is configured to access the introductory content 106, the primary content 108, or both, and provide output. The presentation module 124 may be configured to request content from the server 112 or other devices, and process that content for output. In some implementations the primary content 108 may be protected using a digital rights management ("DRM") scheme. The presentation module 124 may operate in conjunction with a DRM client module 126. The DRM client module 126 may be configured to establish a DRM-authorized session, decrypt the primary content 108 which is encrypted, and so forth.

A user engagement module 128 is configured to provide introductory content 106 before, or contemporaneously with, presentation of at least a portion of the primary content 108. The user engagement module 128 operates in conjunction with one or more of the user interface module 122, the presentation module 124, the DRM client module 126, and other modules.

The user engagement module 128 may use one or more selection parameters 130 to select from one or more pieces of introductory content 106 to present. The selection parameters 130 are descriptive of a setting or situation in which the user device 104 is, or will be, presenting the primary content 108. The setting may include the devices and users 102 involved in the operation of the user device 104. The selection parameters 130 describe the setting using environmental factors, user data, content metadata, and so forth. For example, the user engagement module 128 may select introductory content 106 comprising local news and weather information when the time of day is between 5:00 a.m. and 8:00 a.m., such as when the user 102 may be watching television before going to work. The selection parameters 130 are discussed below in more detail with regard to FIG. 4.

The user engagement module 128 may operate in conjunction with the user interface module 122 to acquire information about the user's 102 interaction with the introductory content 106, the primary content 108, or both. For example, user input to skip or stop presentation of introductory content 106 before the primary content 108 is available for presentation may indicate the introductory content 106 is not favored by the user 102. This information may be used to select introductory content 106 which is of more interest to the user 102, or at least not objected to by the user 102.

By monitoring the point in the presentation of the primary content 108 at which the user input is received, a point of interest in the primary content 108 may be determined. For example, the primary content 108 may include several minutes of studio logos, production company vanity cards, and so forth. With the dual presentation of the presented introductory content 114 and the presented primary content 116, the user's input may be indicative of which of the two is more engaging. When the portion of the primary content 108 which is of interest to the user 102 begins, the user 102 may press a button on the remote control 118 which removes the presented introductory content 114 and leaves the presented primary content 116. The point in the primary content 108 at which the user 102 presses the button may indicate a point of interest such as the start of an opening scene in a movie. The points of interest as acquired from many users 102 accessing the same or similar pieces of content may be acquired and used generate a definitive point of interest associated with the primary content 108. The definitive point of interest may be used such that users 102 may press a button or select an option to automatically "skip" or jump to the point in the primary content 108 at which the definitive point of interest occurs, reducing delay in presenting the portion of the primary content 108 which is of interest.

The user engagement module 128 may be configured to provide introductory content 106 at the beginning of presentation of the primary content 108, upon resumption of presentation of the primary content 108, during buffering of the primary content 108, or on other occasions. In one example, the user 102 may wish to fast forward through the primary content 108 to a point which has not yet been buffered. The introductory content 106 may be presented while the buffering of that primary content 108 occurs. In another example, the user 102 may stop presentation of the primary content 108 for the day, and perhaps view another piece of primary content 108. This stop in presentation may result in a flush of the data buffered for presentation. As a result, when the user presses "play" on the remote control 118 to resume, such as the next day, the primary content 108 may need to be prepared again for presentation. The user engagement module 128 may provide introductory content 106 during this time needed for preparing the presentation of the primary content 108, even though the primary content 108 is being resumed at some point other than the very beginning.

In another implementation, the user engagement module 128 may be configured to provide introductory content 106 during a delay or interruption in presentation of the primary content 108. For example, delays in streaming the primary content 108 may result in a temporary inability to deliver the primary content 108 to the user device 104. Rather than freezing the presentation of the primary content 108, the user engagement module 128 may switch to present introductory content 106 until service is restored.

In some implementations the user engagement module 128 may be configured to provide introductory content 106 during boot of the user device 104, application loading, data processing, and so forth. For example, during startup of the user device 104, suggestions for content such as movies may be presented, engaging the attention of the user 102 while the boot process completes.

As mentioned above, the user device 104 may communicate with one or more servers 112 using the network 110. The server 112 may include a content distribution module 132. The content distribution module 132 is configured to transfer content to the user device 104 for presentation. The content distribution module 132 may be used to send the introductory content 106, the primary content 108, or both. The content may be transferred as a download of a complete file or container object with multiple files, or as a stream.

The server 112 may include a DRM server module 134, configured to implement the DRM scheme on the server 112. For example, the DRM server module 134 may be configured to encrypt the primary content 108 prior to streaming to the user device 104, validate the identity of a particular user device 104 prior to streaming, and so forth.

An introductory content management module 136 is also depicted. The introductory content management module 136 is configured to add, remove, distribute, and otherwise control the introductory content 106 which may be distributed to one or more of the user devices 104. The introductory content management module 136 may be configured to receive data used to generate introductory content 106. For example, the introductory content management module 136 may receive information from a database of movie trivia and use this information to generate introductory content 106 comprising the text of that trivia.

The server 112 may be configured to store the introductory content 106, the primary content 108, or both. A single server 112 is depicted here for ease of illustration and not as a limitation. In some implementations a plurality of physical or virtual servers executing on physical hardware may be used to provide the services and functionality described. For example, a first group of servers 112 may provide distribution and management of the introductory content 106 while a second group of servers 112 may provide distribution of the primary content 108.

Figure 2:
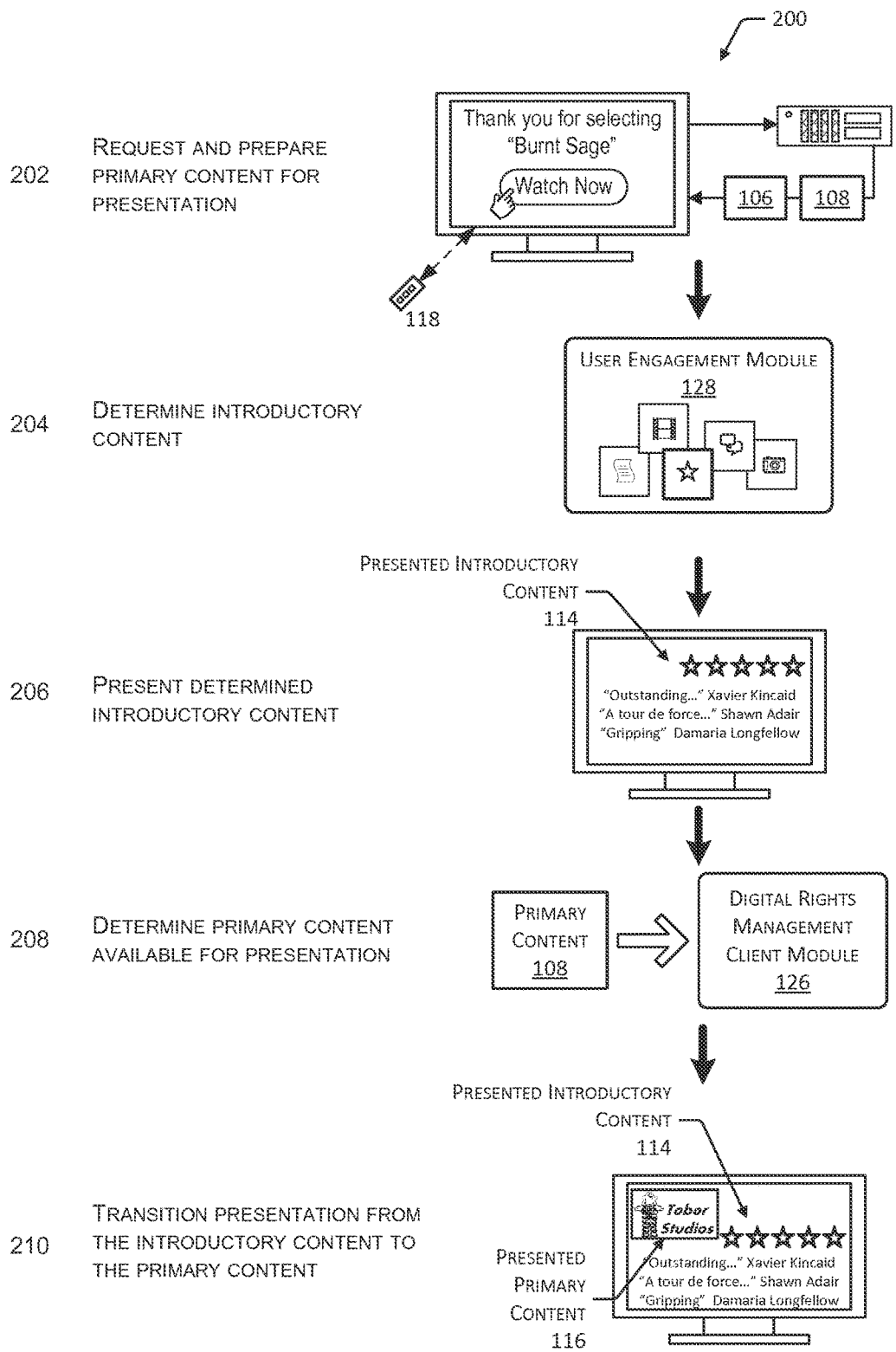
FIG. 2 illustrates a scenario of presenting introductory content while primary content is being prepared for presentation.

FIG. 2 illustrates a scenario 200 of presenting introductory content 106 while primary content 108 is being prepared for presentation. At 202, the user device 104 requests primary content 108 for presentation from the server 112 and begins preparations to present the primary content 108. For example, the preparations may involve exchanging DRM information, validating hardware information, and so forth. This request may be initiated by the user 102 providing user input, such as using the remote control 118 to select the movie "Burnt Sage" to watch.

At 204, the user engagement module 128 determines introductory content 108 for presentation. The determination may be based at least in part on one or more of the selection parameters 130. For example, the user engagement module 128 may select the introductory content 106 which provides reviews about the selected primary content 108.

At 206, the determined introductory content 106 is presented. As illustrated here, the presented introductory content 114 may occupy a significant portion of the display frame on the display.

At 208, the primary content 108 is determined as being available for presentation. For example, the presentation module 124 and the DRM client module 126 may report that the primary content 108 is buffered, decrypted, and ready for presentation.

At 210, the user interface module 122 may transition presentation from the introductory content 106 to the primary content 108. As shown here, the presented primary content 116 may be presented as a "picture-in-picture", allowing for simultaneous viewing of the presented introductory content 114 and the presented primary content 116. The transition may involve various visual effects such as a cut, fade, blur, moving windows, and so forth. For example, the presented primary content 116 may expand to fill the entire display frame and the presentation of the now-obscured presented introductory content 114 may be discontinued.

The transition may be automatic or based at least in part on user input. For example, the automatic transition may occur at the conclusion of the presentation of the introductory content 106. Or the transition may be triggered by manual input.

Figure 3:
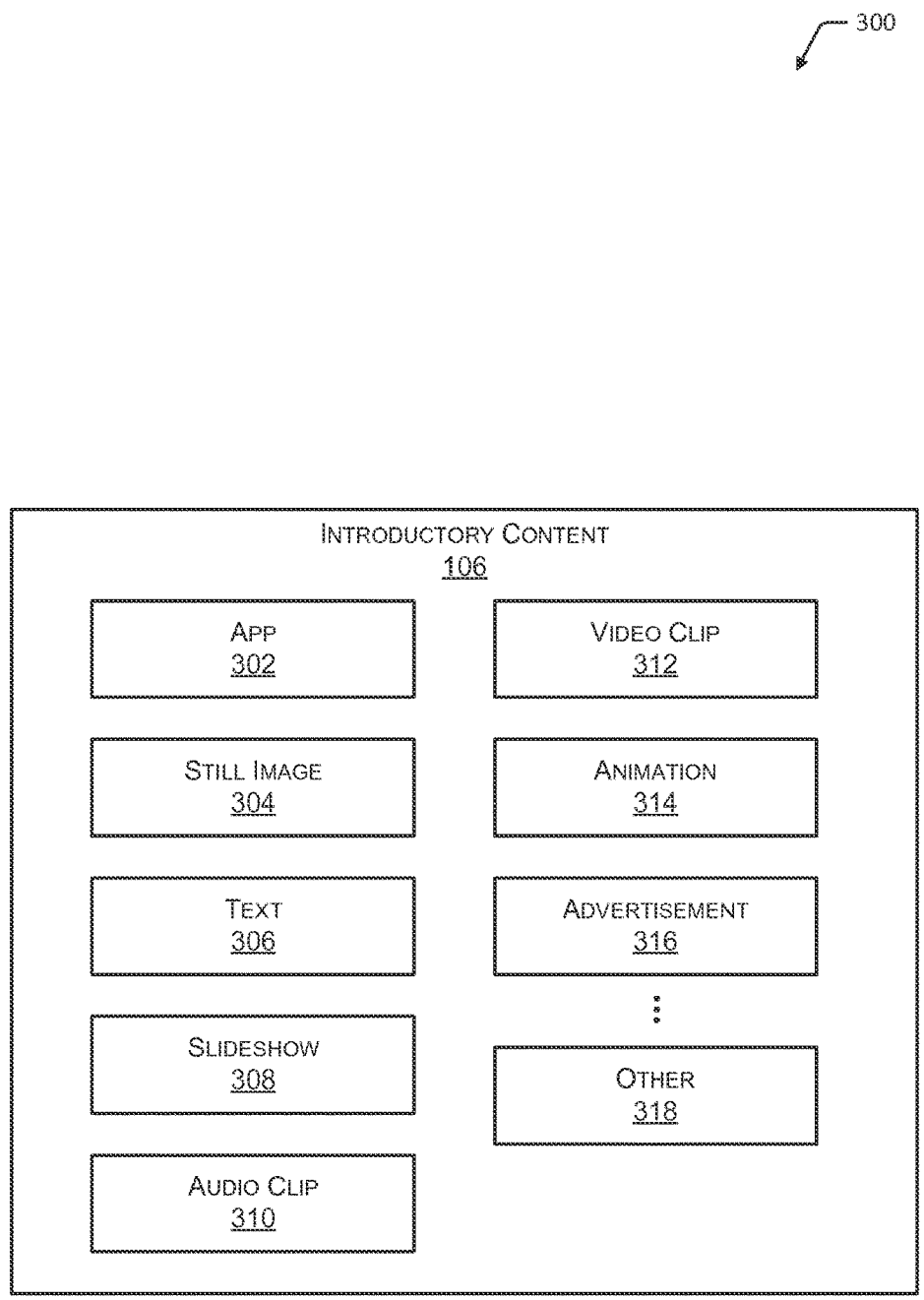
FIG. 3 illustrates a schematic of introductory content which may be presented.

FIG. 3 illustrates a schematic 300 of the introductory content 106 which may be presented. In some implementations the introductory content 106 may have a duration or length which is less than that of the primary content 108. For example, the introductory content 106 may be designed for consumption by the user 102 in one minute or less. This duration or length may be for a portion which is subsequently "looped" or repeated. For example, the duration of introductory content 106 comprising an animated short may be four seconds, but the introductory content 106 may be looped or repeated indefinitely.

The introductory content 106 comprises information which, when presented, may be used to engage the attention of the user 102. The introductory content 106 may be expressed using a markup language such as hypertext markup language ("HTML"), as an executable binary, an audio file, an image file, and so forth. The introductory content 106 may be configured for single presentation, looped or repeated presentation, or for transition to another piece of introductory content 106. In some implementations the introductory content 106 may be associated with the primary content 108.

The introductory content 106 may include an application ("app") 302. The app 302 may provide functionality such as an interactive game. For example, the app 302 may be configured to present the user 102 with a word game. The app 302 may be configured to receive user input such as the user's 102 gaze, speech, input from the remote control 118, touches on a touch sensor, and so forth. The app 302 may be configured to be responsive to one or more of these inputs. The app 302 may also feature one or more creative elements from the primary content 108. The creative elements may include logos, icons, characters, colors, images, sounds, and so forth. For example, where the primary content 108 comprises an animated movie, the introductory content 106 may comprise a short game using characters from the movie.

One or more still images 304 may be used as introductory content 106. These images may be provided by the server 112 or by another device. For example, the still images 304 may include pictures of popular actors which have been previously stored on the user device 104. Or the still images 304 may include photos from a family photo album. The one or more still images 304 may also be derived from the primary content 108. For example, the still images 304 may comprise frames which have been extracted or retrieved from the primary content 108.

Text 306 may be used as introductory content 106. The text may include information such as news, weather, stocks, trivia, riddles, quotes, and so forth. For example, the user engagement module 128 may retrieve information from the server 112 comprising quotes associated with the user's 102 favorite author. These quotes may be presented as the introductory content 106. The text 306 may also be based at least in part on the primary content 108. For example, the text 306 may be quotes of dialog from the primary content 108.

The introductory content 106 may include a slideshow 308, such as a series of images, text, and so forth. Audio clips 310 may be presented, as well as video clips 312. Animations 314 may be provided. For example, a cartoon character's antics may be animated for presentation. These also may be derived from, extracted from, or based upon the primary content 108.

Advertisements 316 may also be presented. These advertisements 316 may include apps, images, text, slideshows, web pages, audio clips, video clips, animations, and so forth. The advertisements 316 may be configured to present information about products or services which are associated with the user 102, the primary content 108, or various combinations. For example, the introductory content 106 presented upon restart of presentation of the primary content 108 may include an advertisement for a product which is visible in the subsequently presented scene of the primary content 108.

As described above, the introductory content 106 may be generated by the user 102. For example, the still images 304 may include a personal photo album. The user 102 may also share a piece of generated introductory content 106 with others. For example, the user 102 may have created an interesting slideshow 308 and may share this with other users 102(U). This sharing may be implemented by using a social networking service, uploading the slideshow 308 to the servers 112 introductory content management module 136 for distribution, and so forth.

The various types of introductory content 106 may be combined. For example, the still image 304 and the text 306 may be presented at the same time as the advertisement 316. Other 318 introductory content 106 may also be available.

Figure 4:
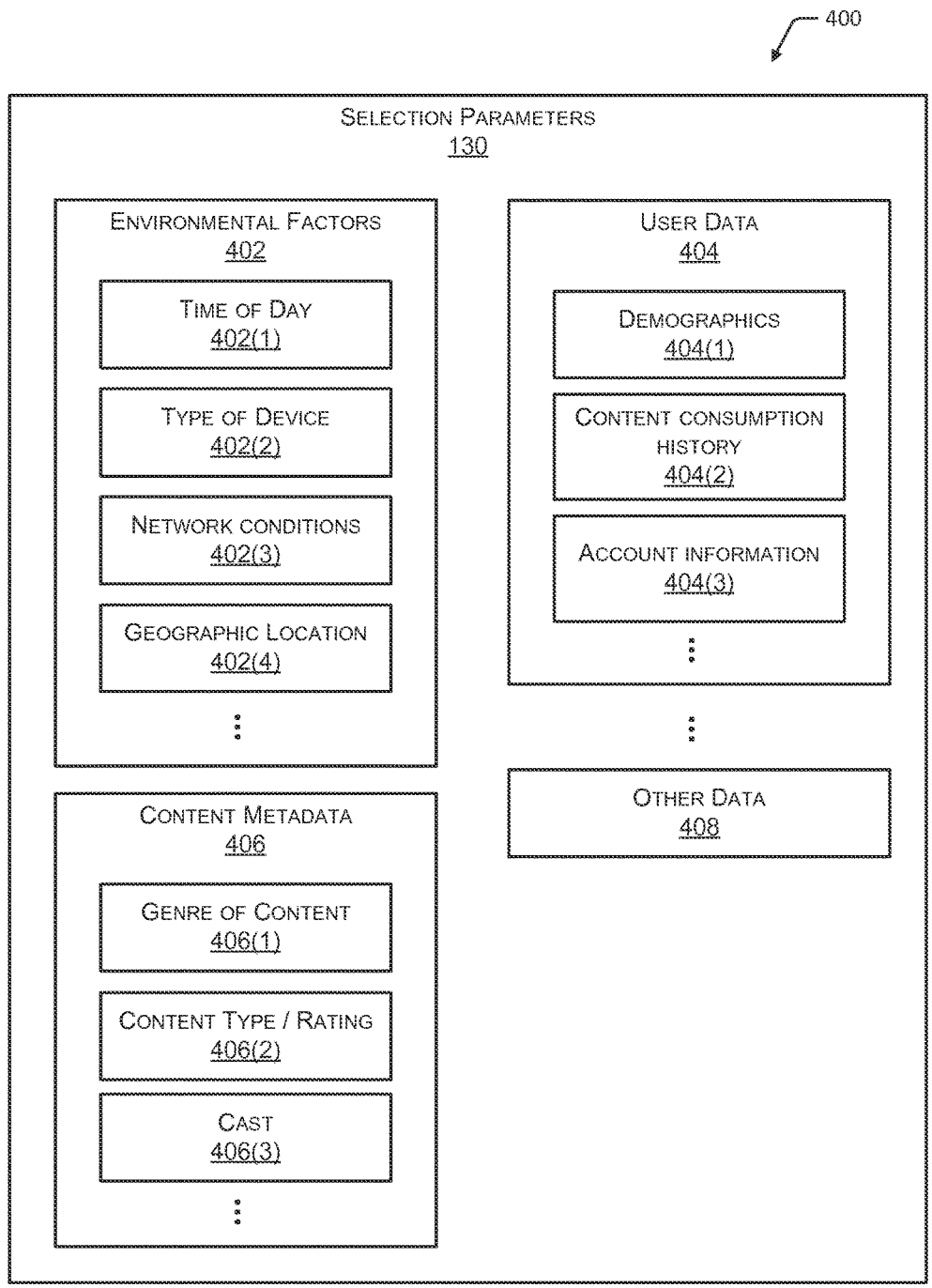
FIG. 4 illustrates a schematic of selection parameters which may be used to select introductory content for presentation.

FIG. 4 illustrates a schematic 400 of the selection parameters 130 which may be used to select the introductory content 106 for presentation. The user engagement module 128 may use one or more of the selection parameters 130 to select a particular piece of introductory content 106.

The selection parameters 130 may include environmental factors 402. The environmental factors 402 are information about the environment around or associated with the user device 104, the user 102, and so forth. The environmental factors 402 may include time of day 402(1), type of device 402(2), network conditions 402(3), geographic location 402(4), and so forth. For example, the time of day 402(1) at the user device 104 may include a current date, a current time, or both, and may be used to select introductory content 106 which is child-friendly in the morning. The type of device 402(2) may be used to provide introductory content 106 which corresponds to the capabilities of the user device 104. For example, the introductory content 106 which comprises an app 302 calling for user input with a touch sensor would not be provided to the television user device 104. Likewise, when the network conditions 402(3) indicate congestion and corresponding low bandwidth, the user engagement module 128 may select locally stored introductory content 106 which is longer in duration to allow more time for setup of the primary content 108 over the congested connection. The geographic location (also known as "geolocation") 402(4) provides information about the physical location of the user device 104, the user 102, or both. For example, the introductory content 106 may include information about events occurring in the local neighborhood.

The selection parameters 130 may also include user data 404. The user data 404 is information which is associated with the user 102 or a group of users 102. The user data 404 may include demographics 404(1). The demographics 404(1) may include data about the user's 102 residence, occupation, age, and so forth. For example, Introductory content 106 may be selected by the user engagement module 128 which is popular in a particular user's 102 local neighborhood.

The user data 404 may also include content consumption history 404(2). The content consumption history 404(2) may include data about previous pieces of introductory content 106 and primary content 108 which the user 102 has consumed. Other information such as data indicative of the user's 102 like or dislike for the content may be included.

In some implementations, consumption history of other goods and services may be considered. For example, the user's 102 recent purchase of luggage may result in the user engagement module 128 presenting introductory content 106 which includes an advertisement 316 for a vacation trip.

The user data 404 may also include account information 404(3). The account information 404(3) may include data such as primary content 108 which is on particular watch lists for later consumption, current account status, and so forth. For example, the user 102 may be presented with additional animations 314 upon upgrading to a higher level of service with a merchant.

The selection parameters 130 may also include content metadata 406. The content metadata 406 may be for the introductory content 106, the primary content 108, or both. The content metadata 406 may include a genre of content 406(1), a content type or rating 406(2), cast 406(3), and so forth. The content metadata 406 comprises information indicative of one or more characteristics of the primary content 108 and may be used, at least in part, to select the introductory content 106. For example, the user engagement module 128 may use the cast 406(3) data to determine that the primary content 108 includes the actor "Brett Flume." Introductory content 106 which is about "Brett Flume" may be retrieved and presented to the user 102.

The selection parameters 130 may include other data 408. For example, social media data indicative of trends, ad campaign information from advertisers, and so forth may be used to select the introductory content 106.

Figure 5:
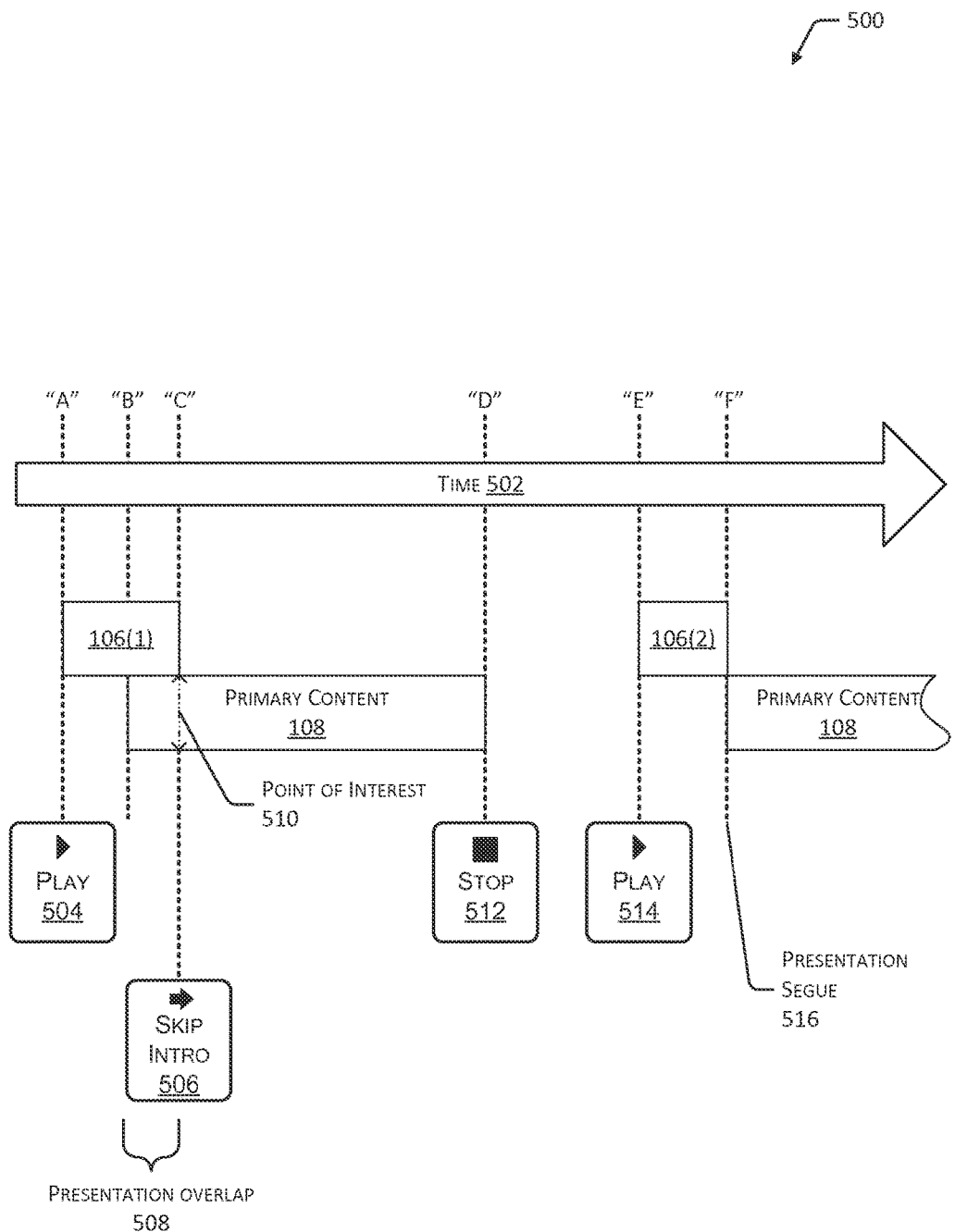
FIG. 5 illustrates a timeline of presenting introductory and primary content and determining a point of interest in the primary content based at least in part on user input.

FIG. 5 illustrates a timeline 500 of presenting introductory content 106 and primary content 108. In this illustration time increases from left to right, as indicated by arrow 502.

Beginning at time 502 "A", presentation begins. For example, the user 102 may press the play 504 control on the remote control 118 to show the primary content 108 of "Burnt Sage". As described above, the primary content 108 may take some time to be ready for presentation to the user 102. Thus, at time 502 "A", a first piece of introductory content 106(1) is presented. At time 502 "B" the primary content 108 is available and presentation may begin. As depicted above in FIGS. 1 and 2, the presented introductory content 114 and the presented primary content 116 may be presented contemporaneously. As shown in FIG. 5, at time 502 "B", the presented primary content 116 may be presented as a window within the presented introductory content 114.

At time 502 "C", the user input may be received, such as the user 102 pressing the skip intro 506 control on the remote control 118. At least partly in response to this input, the presentation of the introductory content 106(1) is discontinued, while the presentation of the primary content 108 continues. An interval extending from time 502 "B" to "C" is a presentation overlap 508. During the presentation overlap, the introductory content 106 and the primary content 108 are presented contemporaneously.

In some implementations, the primary content 108 may not be presented, even when available, until user input is received, or a particular point is reached in the primary content 108. For example, the presented primary content 116 may be omitted from the display of the user device 104 until the skip intro 506 control is activated. In yet another implementation, a portion of the primary content 108 may be presented. For example, audio from the primary content 108 may be played using the speakers of the user device 104, while the display of the user device 104 presents only the presented introductory content 114.

A point of interest 510 may be defined at a point in the primary content 108 at which the user 102 provides input indicative of a desire to stop presenting the introductory content 106. For example, the point in time in the primary content 108 at which the user 102 activates the skip intro 506 control may be designated a point of interest 510. This point of interest 510 may be when the first scene of the movie begins, when music at a concert performance begins after remarks of a conductor, and so forth.

During consumption of the primary content 108 the user 102 may stop the presentation. As shown here, at time 502 "D" the user 102 may press a stop 512 control on the remote control 118. Responsive to this user input, the user device 104 may cease presentation of the primary content 108.

Once stopped, at a later time the user 102 may wish to resume presentation. Resumption of the presentation may involve the same or similar delays in setting up and presenting the primary content 108. As a result, when the user 102 provides the user input at time 502 "E", such as by activating the play 514 control, the user engagement module 128 may be configured to provide introductory content 106(2). The introductory content 106(2) may differ from the introductory content 106(1). For example, the introductory content 106(1) presented at the beginning of the presentation of the primary content 108 may have been movie trivia, while the introductory content 106(2) on resume may be an advertisement 316 for a particular item which appears in the subsequent scene of the primary content 108.

As illustrated here, the primary content 108 becomes available for presentation at time 502 "F". The transition from the introductory content 106(2) to the primary content 108 may be a presentation segue 516. The presentation segue 516 may include an abrupt cut from the introductory content 106 to the primary content 108, a fade from one to the other, and so forth. As before, with the primary content 108 available for presentation, presentation of the introductory content 106(2) may be discontinued.

As described above, the introductory content 106 may also be presented when the primary content 108 is unavailable. For example, the user 102 may fast forward or rewind through the primary content 108 to a point which is not stored in the buffer. The introductory content 106 may be presented while the buffering of the primary content 108 at that point occurs.

Figure 6:
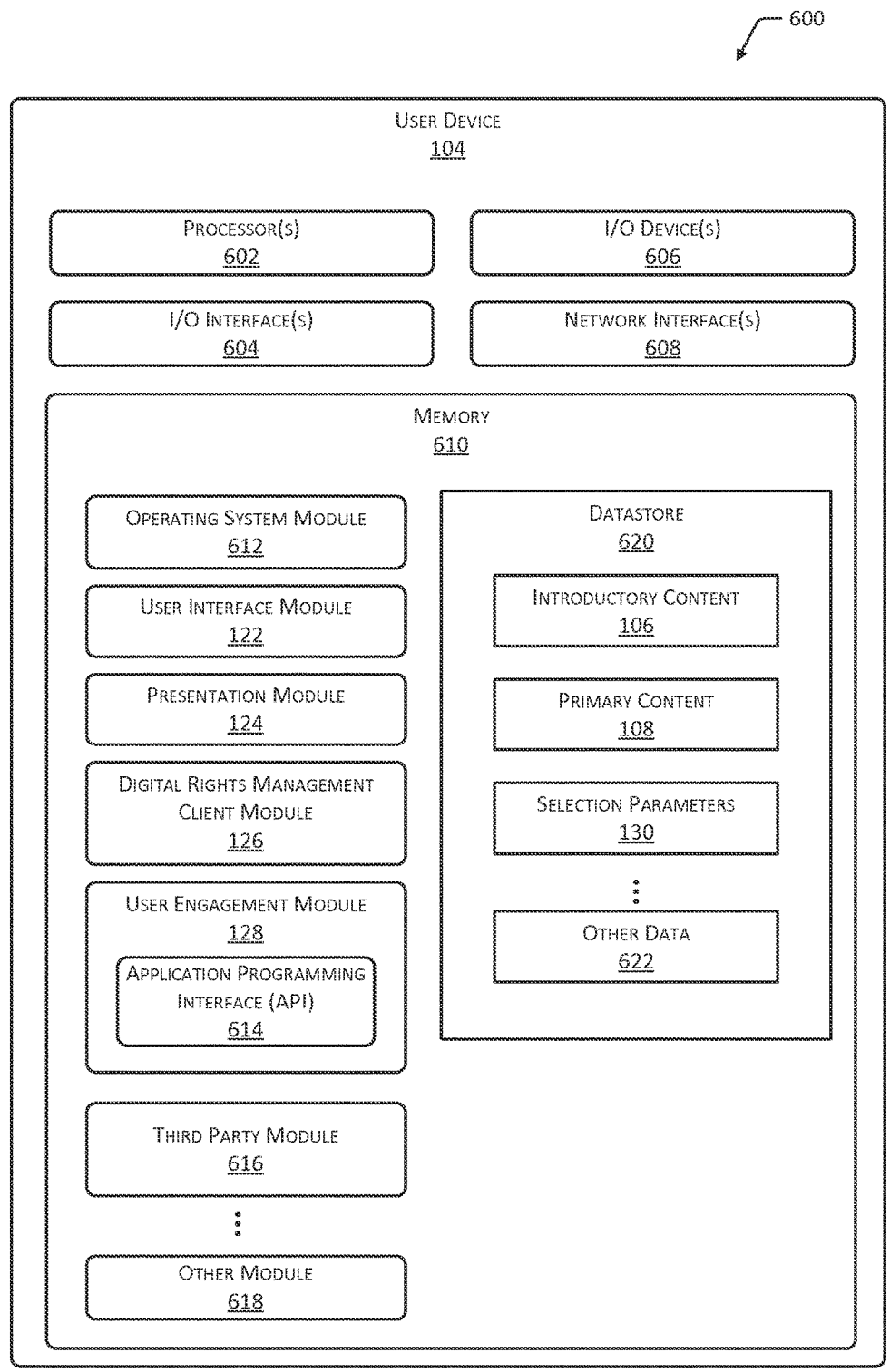
FIG. 6 illustrates a block diagram of a user device configured to present introductory content before beginning presentation of primary content.

FIG. 6 illustrates a block diagram 600 of the user device 104 configured to present the introductory content 106 before beginning presentation of primary content 108.

The user device 104 may include one or more processors 602 configured to execute one or more stored instructions. The processors 602 may comprise one or more cores. The user device 104 may include one or more input/output ("I/O") interface(s) 604 to allow the processor or other portions of the user device 104 to communicate with other devices. The I/O interfaces 604 may comprise inter-integrated circuit ("I2C"), serial peripheral interface bus ("SPI"), USB, RS-232, user device interface such as HDMI, and so forth.

The I/O interface(s) 604 may couple to one or more I/O devices 606. The I/O devices 606 may include input devices such as one or more of a camera, a microphone, a touch sensor, a button, and so forth. The I/O devices 606 may also include output devices such as one or more of a display, audio speakers, haptic output device and so forth. In some embodiments, the I/O devices 606 may be physically incorporated with the user device 104 or may be externally placed.

The user device 104 may also include one or more network interfaces 608. The network interfaces 608 are configured to provide communications between the user device 104 and other devices such as the server 112. The network interfaces 608 may include personal area networks, wireless local area networks, wireless wide area networks, and so forth. The user device 104 may communicate with the remote control 118 using one or more of the network interfaces 608. For example, the user device 104 may communicate with the remote control 118 using a Bluetooth personal area network.

As described above, the user device 104 may include one or more device interfaces. The device interfaces may include one or more of a HDMI, TOSLINK, Ethernet, analog video, analog audio, IEEE 1394, USB, Bluetooth, ZigBee, and so forth. The device interfaces may allow for wired or wireless communication between the user device 104 and the other user devices.

The user device 104 may also include one or more busses or other internal communications hardware or software that allow for the transfer of data between the various modules and components of the user device 104.

As shown in FIG. 6, the user device 104 includes one or more memories 610. The memory 610 comprises one or more computer-readable storage media ("CRSM"). The CRSM may be any one or more of an electronic storage medium, a magnetic storage medium, an optical storage medium, a quantum storage medium, a mechanical computer storage medium and so forth. The memory 610 provides storage of computer readable instructions, data structures, program modules and other data for the operation of the user device 104.

The memory 610 may include at least one operating system (OS) module 612. The OS module 612 is configured to manage hardware resource devices such as the I/O interfaces 604, the I/O devices 606, the network interfaces 608, the device interfaces, and provide various services to applications or modules executing on the processors 602. Also stored in the memory 610 may be the user interface module 122, the presentation module 124, the DRM client module 126, and the user engagement module 128.

As described above, the user interface module 122 is configured to provide the user interface to the user 102 using the I/O devices 606 and accept inputs received from the I/O devices 606 or other devices coupled to the user device 104. The user interface may include one or more visual, audible, or haptic elements. For example, the user interface may be configured to provide an audible user interface using the speakers which includes audible introductory content 106 before presenting primary content 108 comprising a concert.

The presentation module 124 is configured to present content on, or in conjunction with, the user device 104. The presentation module 124 may be configured to receive streamed content from an external source device such as the server 112, or may access content which has been previously stored on the user device 104 in the memory 610. The presentation module 124 may work in conjunction with the DRM client module 126 to support digital rights management, presentation of encrypted content, and so forth. As described above, the DRM client module 126 is configured to support presentation of content which is protected by one or more digital rights management schemes.

As described above, the user device 104 may include the user engagement module 128 which is configured to present introductory content 106 before presentation of the primary content 108. In some implementations one or more of the functions of the user engagement module 128 may be executed on another device, such as the server 112.

The user engagement module 128 may provide an application programming interface ("API") 614 which allows for exchange of data with one or more third party modules 616. In one implementation, the introductory content 106 may be provided by third party modules 616. For example, the third party module 616 may be configured to provide introductory content 106 comprising trivia associated with particular actors. The third party module 616 may send the introductory content 106 to the user engagement module 128 using the API 614. The third party modules 616 may include web browsers, mail clients, image management applications, and so forth.

The API 614 may also be used to exchange information about a state of the user engagement module 128 and the presentation module 124 with the third party modules 616. Information about changes in the presentation state may be passed along to the third party module 616 using the API 614. The third party module 616 may use this information to provide introductory content 106, or to provide data indicative of a particular piece of introductory content 106, to present. Other APIs 614 may be provided as well.

Other modules 618 may be stored in the memory 610. For example, a speech recognition module may be provided to allow the user 102 to verbally enter user input.

The memory 610 may also include a datastore 620 to store information. The datastore 620 may use a flat file, database, linked list, tree, or other data structure to store the information. In some implementations, the datastore 620 or a portion of the datastore 620 may be distributed across one or more other devices including servers 112, network attached storage devices and so forth.

The datastore 620 may store one or more of at least a portion of the introductory content 106, at least a portion of the primary content 108, at least a portion of the selection parameters 130, or other data 622. For example, the other data 622 may include user input, information about points of interest 510 for presented primary content 116, and so forth.

Figure 7:
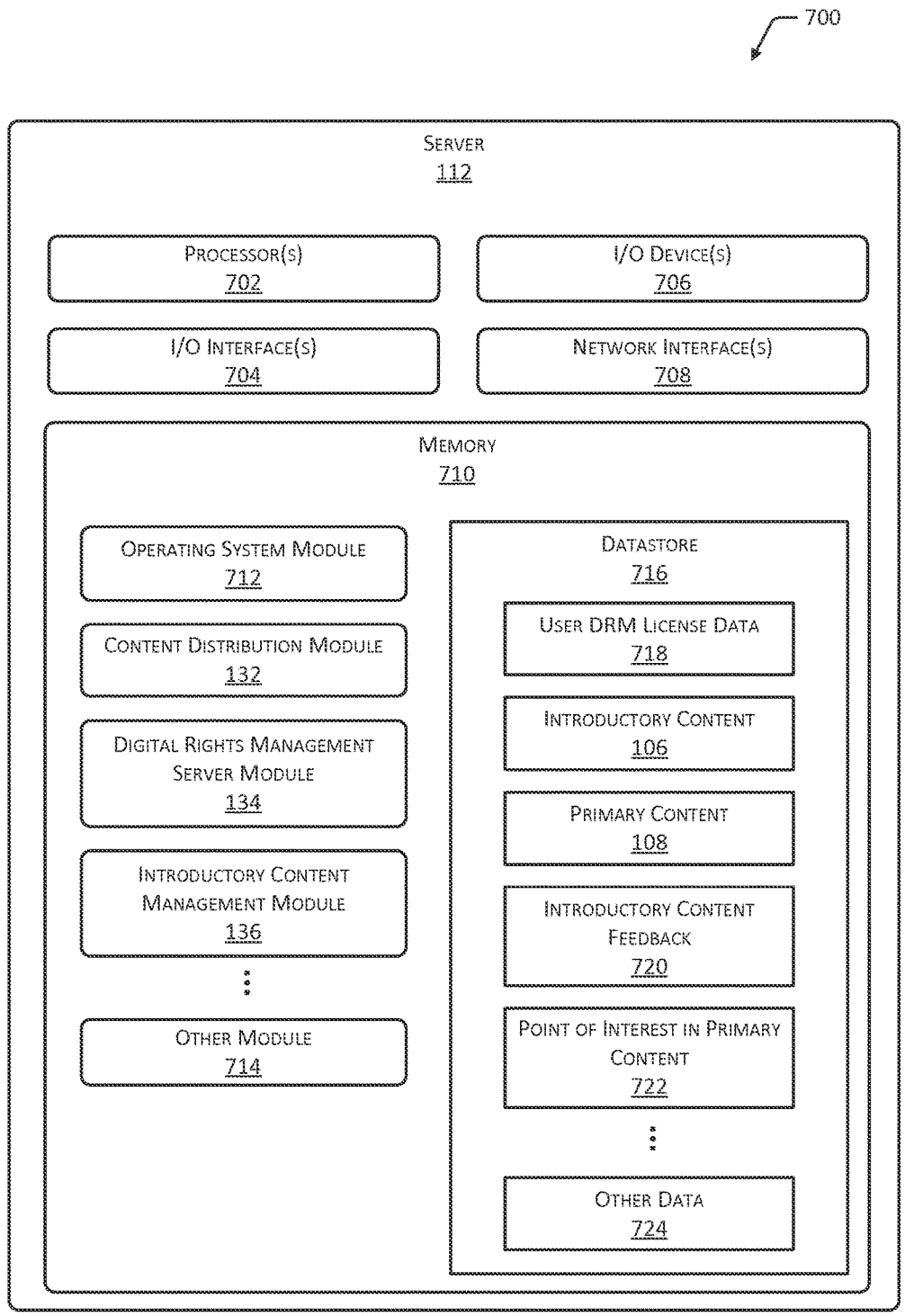
FIG. 7 illustrates a server configured to provide management of the introductory content.

FIG. 7 illustrates a block diagram 700 of the server 112 configured to provide management of the introductory content 106. The server 112 may be implemented as one or more servers. The one or more servers may be physical server devices or virtual servers executing on physical server devices.

The server 112 may include one or more processors 702 configured to execute one or more stored instructions. The processors 702 may comprise one or more cores. The server 112 may include one or more I/O interface(s) 704 to allow the processor or other portions of the server 112 to communicate with other devices. The I/O interfaces 704 may comprise I2C, SPI, USB, RS-232, and so forth.

The I/O interface(s) 704 may couple to one or more I/O devices 706. The I/O devices 706 may include input devices such as one or more of a keyboard, a touch sensor, and so forth. The I/O devices 706 may also include output devices such as one or more of a display, printer, and so forth. In some embodiments, the I/O devices 706 may be physically incorporated with the server 112 or may be externally placed.

The server 112 may also include one or more network interfaces 708. The network interfaces 708 are configured to provide communications between the server 112 and other devices such as the user device 104 using the network 110. The network interfaces 708 may include wireless local area networks, wireless wide area networks, and so forth. For example, the network interfaces 708 may include an Ethernet interface which connects to the network 110.

The server 112 may also include one or more busses or other internal communications hardware or software that allow for the transfer of data between the various modules and components of the server 112.

As shown in FIG. 7, the server 112 includes one or more memories 710. The memory 710 comprises one or more CRSM. The memory 710 provides storage of computer-readable instructions, data structures, program modules and other data for the operation of the server 112.

The memory 710 may include at least one operating system (OS) module 712. The OS module 712 is configured to manage hardware resource devices such as the I/O interfaces 704, the I/O devices 706, the network interfaces 708, the device interfaces, and provide various services to applications or modules executing on the processors 702. Also stored in the memory 710 may be the content distribution module 132, the DRM server module 134, and the introductory content management module 136.

As described above, the content distribution module 132 is configured to transfer content to the user device 104 for presentation. The content distribution module 132 may be used to send the introductory content 106, the primary content 108, or both. The content may be transferred as a download of a complete file or container object with multiple files. The content may also be streamed, that is, sent in portions over time which allows for presentation to begin before receiving all of the portions.

The DRM server module 134 is configured to implement the DRM scheme on the server 112. For example, the DRM server module 134 may be configured to encrypt the primary content 108 prior to streaming to the user device 104, validate the identity of a particular user device 104, and so forth.

The introductory content management module 136 is configured to add, remove, distribute, and otherwise control the introductory content 106 which may be distributed to one or more of the user devices 104. The introductory content management module 136 may be configured to receive data used to generate introductory content 106. For example, the introductory content management module 136 may receive information from a database of movie trivia and use this information to generate introductory content 106 comprising the text of that trivia. An application programming interface may be configured to allow other modules 714 on the server 112 or on another server to provide introductory content 106 for presentation.

The introductory content management module 136 may be configured to exchange data with the user engagement module 128 of the user device 104. For example, the introductory content management module 136 may provide information about trends in what introductory content 106 is popular to the user engagement module 128.

In some implementations the user engagement module 128 may operate at least in part on the server 112. For example, some user devices 104 may omit the user engagement module 128 and instead receive data from the server 112 indicating what introductory content 106 to present.

Other modules 714 may be stored in the memory 710. For example, a social networking interface module may be configured to exchange information with a social networking server.

The memory 710 may also include a datastore 716 to store information. The datastore 716 may use a flat file, database, linked list, tree, or other data structure to store the information. In some implementations, the datastore 716 or a portion of the datastore 716 may be distributed across one or more other devices including servers 112, network attached storage devices and so forth.

The datastore 716 may store one or more of user DRM license data 718, introductory content 106, primary content 108, introductory content feedback 720, point of interest in primary content 722, or other data 724. The user DRM license data 718 provides information about what users 102 have access to primary content 108. The introductory content feedback 720 comprises information indicative of whether a user 102 has skipped a particular piece of introductory content 106, replayed or extended the presentation of the introductory content 106, and so forth.

The point of interest in primary content 722 comprises data indicative of a particular definitive point of interest which has been determined for a particular piece of primary content 108. As described above, information may be acquired indicating at what point in the primary content 108 the user 102 decided to discontinue presentation of the introductory content 106. This information may be used to determine a particular point of interest, such as the time in the primary content 108 at which the first scene of a movie begins.

Other data 724 may also be stored. For example, the other data 724 may include administrator preferences, account information associated with the user 102, and so forth.

In one implementation one or more of the functions of the server 112 may be provided on the user device 104. For example, in some implementations the user device 104 may include the introductory content management module 136. In this implementation, the server 112 as a separate device may be omitted from the system, and the user device 104 may operate to provide introductory content 106.

Illustrative Processes

Figure 8:
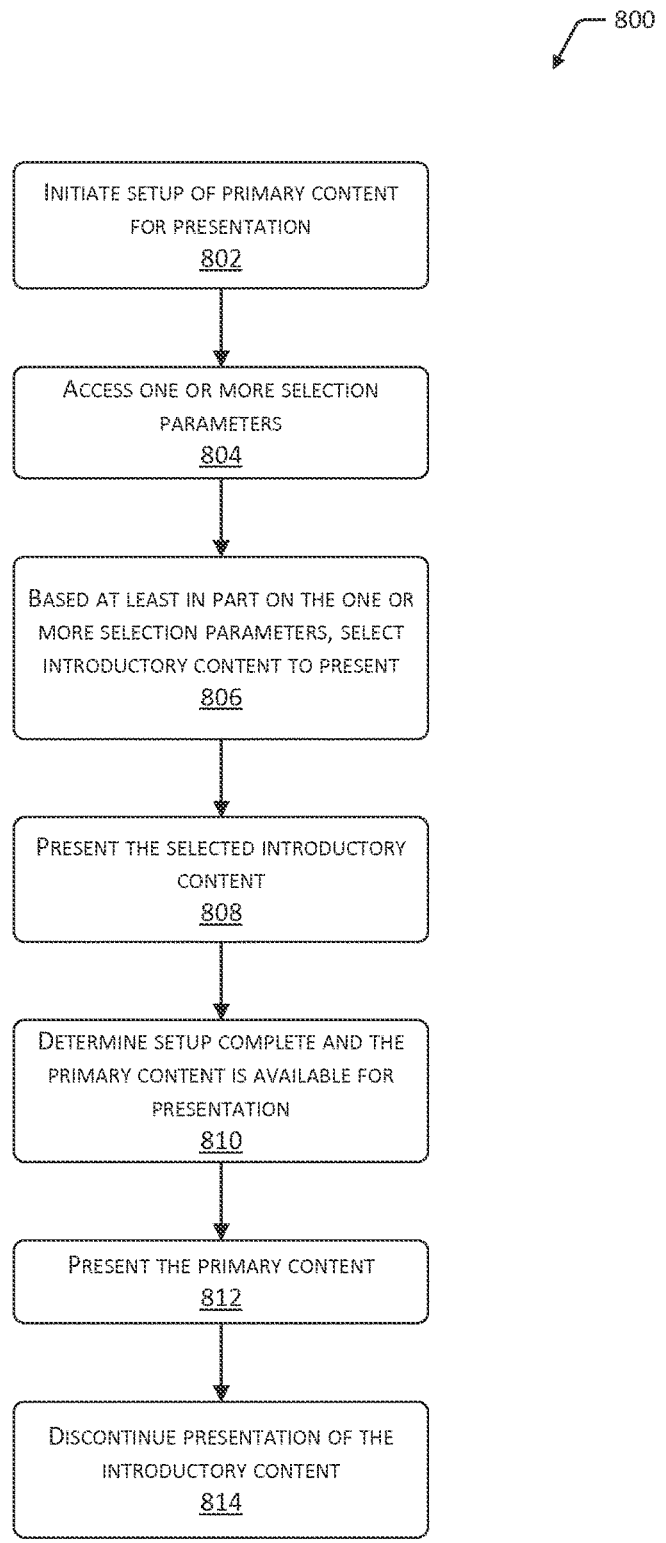
FIG. 8 is a flow diagram of a process of using one or more selection parameters to select introductory content for presentation.

FIG. 8 is a flow diagram 800 of a process of using one or more selection parameters to present introductory content 106 and primary content 108. In some implementations this process may be provided by the user device 104, the server 112, or a combination of both.

Block 802 initiates setup of primary content 108 for presentation. As described above, the primary content 108 may comprise video protected using a digital rights management scheme, may require time for data transfer, and so forth. The setup may comprise decrypting at least a portion of the primary content 108 which has been previously encrypted using a digital rights management scheme.

Block 804 accesses one or more selection parameters 130. As described above with regard to FIG. 4, the selection parameters 130 may include one or more of the network conditions 402(3) associated with delivery of the primary content 108, the genre of content 406(1) of the primary content 108, the content type 406(2) of the primary content 108, the cast 406(3) of the primary content 108, the demographics 404(1) of the user 102, the content consumption history 404(2) of the user 102, and so forth. For example, the environmental factors 402 of the user device 104 may be accessed, such as the current network conditions 402(3) at the user device 104. In another example, the selection parameters 130 may contain information indicative of one or more characteristics of the primary content 108, such as the content metadata 406.

Based at least in part on the one or more selection parameters 130, block 806 selects the introductory content 106 to present. This selection may be from a plurality of pieces of introductory content 106 which are available either locally to the user device 104 or from an external device. As described above with regard to FIG. 3, the introductory content 106 may include many different forms of content. Continuing the example, based on congested network conditions, the selection may be for a locally stored game app 302 which will keep the user 102 engaged for more than a few seconds while the primary content 108 is retrieved over the congested network. As described above, the game app 302 may be configured to respond to user input.

Block 808 presents the selected introductory content 106. For example, the game app 302 may be executed and presented on the user device 104.

Block 810 determines the setup of the primary content 108 is complete and the primary content 108 is available for presentation. For example, the DRM client module 126 may have completed decryption of a portion of the primary content 108 sufficient to begin presentation.

Block 812 presents the primary content 108. For example, the decrypted portion of the primary content 108 may be presented on the display and the speakers of the user device 104. In some implementations the presentation of the primary content 108 may be contemporaneous with the presentation of the introductory content 106.

Block 814 discontinues presentation of the introductory content 106. As described above, the discontinuation may use one or more transition effects. For example, the presented introductory content 114 may fade out to be replaced with the presented primary content 116.

In some implementations the sequence of the blocks may be varied. For example, the operations of block 814 may occur before the operations of block 812.

Figure 9:
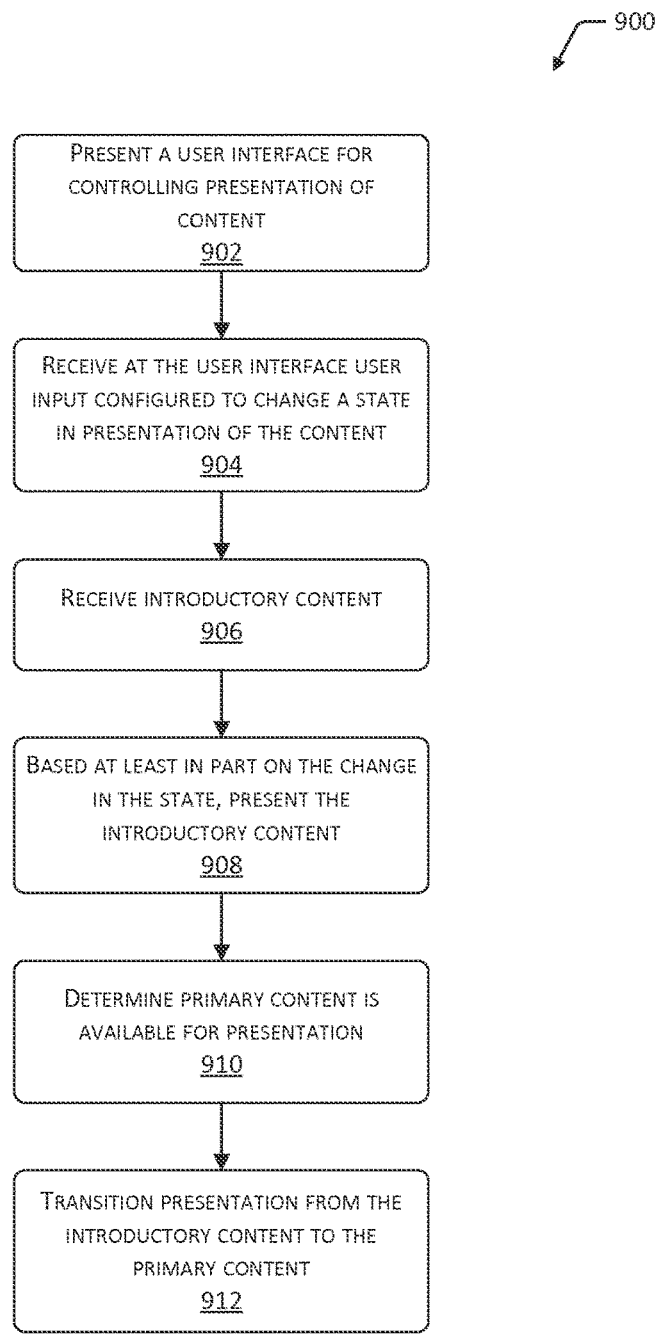
FIG. 9 is a flow diagram of a process of presenting introductory and primary content.

FIG. 9 is a flow diagram of a process of presenting introductory and primary content. In some implementations this process may be provided by the user device 104, the server 112, or a combination of both.

Block 902 presents a user interface having one or more user interface elements for controlling presentation of the introductory content 106, the primary content 108, or both. These user interface elements may include buttons on the remote control 118, on-screen controls, voice commands, and so forth. The user interface may be provided at least in part by the user interface module 122. The user interface may be used to control the presentation module 124, the user engagement module 128, or other modules which interact with content comprising audio, video, or audio and video.

Block 904 receives, with the user interface, user input configured to change a state in presentation of the content. For example, the user input may comprise a command to start initial presentation, a command to pause presentation, a command to fast forward, a command to rewind, or a command to stop presenting content. For example, the user interface module 122 may process user input indicating a play, pause, stop, and so forth. In some implementations data indicative of the change of the state may be sent to an application using an application programming interface.

Block 906 receives introductory content 106. The introductory content 106 may be received from local storage, such as the memory 610 of the user device 104, from the server 112, and so forth. In some implementations, the introductory content 106 may be received using an application programming interface ("API") 614 configured to couple to one or more applications. For example, the API 614 may allow a third-party module such as a social networking message app to provide text 306 for the introductory content 106.

As described above with regard to FIG. 3, the introductory content 106 may include a variety of different forms and pieces of content. In some implementations, the duration of the introductory content 106 is less than the duration of the primary content 108. For example, the introductory content 106 may be a slideshow 308 configured to present in eight seconds, while the primary content 108 may comprise a three-hour-long movie.

Based at least in part on the change in the state, block 908 presents the introductory content 106. For example, based on a suspension of presentation of the primary content 108 during a fast forward through the content, the introductory content 106 may be presented. Audible introductory content 106 may be presented using speakers, visual introductory content 106 using a display, haptic introductory content 106 using one or more haptic output devices, and so forth.

Block 910 determines primary content 108 is available for presentation. For example, the DRM client module 126 may have completed decryption of an initial portion of the primary content 108 for presentation.

Block 912 transitions presentation from the introductory content 106 to the primary content 108. As described above, the transition may involve a switch from the introductory content 106 to the primary content 108, contemporaneous or simultaneous presentation of both, or a combination thereof.

In one implementation the transition may include several additional blocks. A first block may present the introductory content 106 within a display frame. A second block may present the primary content 108 within the same display frame as the introductory content 106. For example, the "picture-in-picture" effect illustrated in FIG. 2. A third block may then discontinue the presentation of the introductory content 106.

Figure 10:
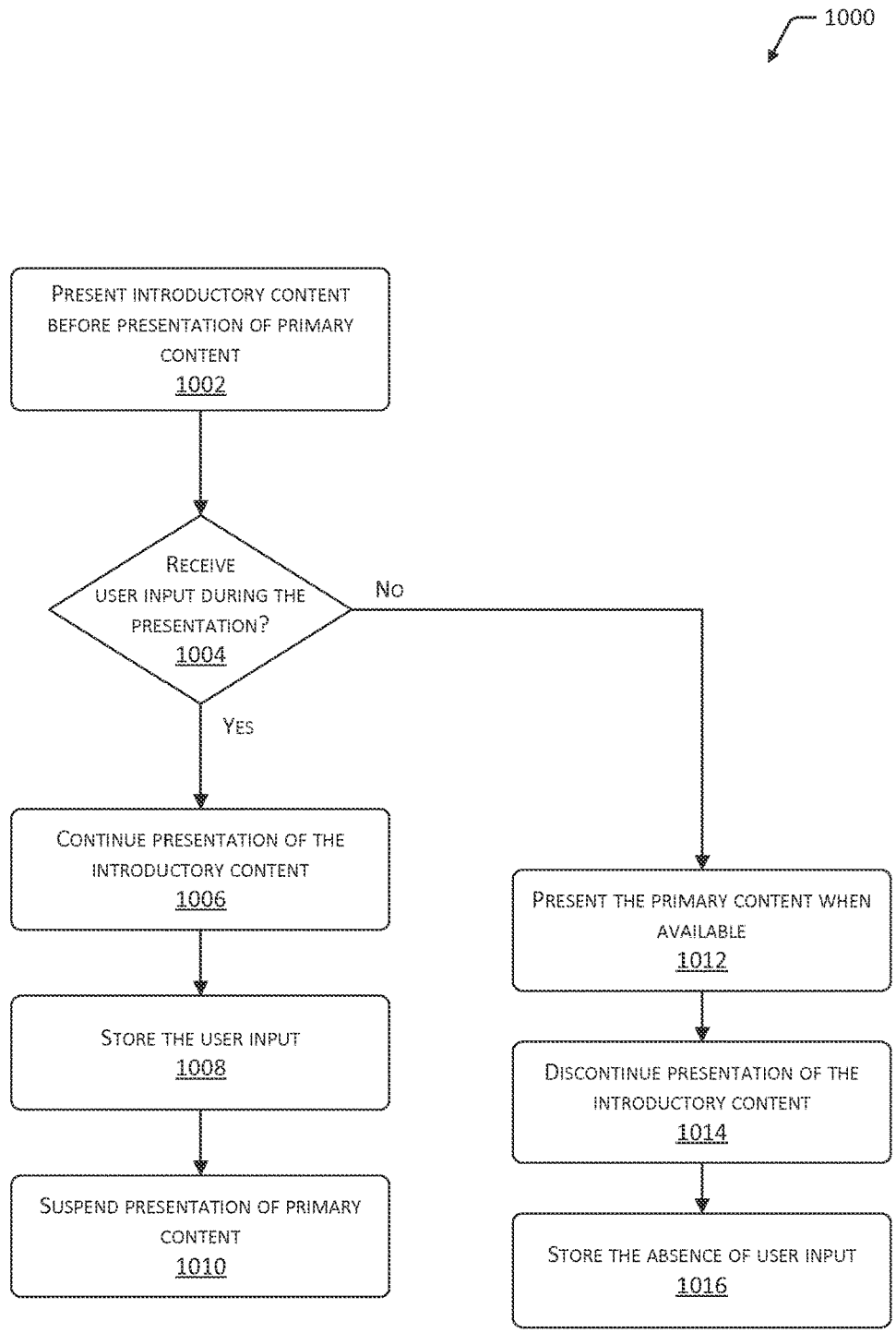
FIG. 10 is a flow diagram of a process of gathering user input associated with the introductory content to determine interest in the introductory content.

FIG. 10 is a flow diagram 1000 of a process of gathering user input associated with the introductory content 106 to determine interest in the introductory content 106. The user input associated with the introductory content 106 may provide useful information about whether the introductory content 106 is engaging, liked, disliked, and so forth, by the users 102. In some instances, the user 102 may find the introductory content 106 particularly interesting or engaging and wish the presentation to continue. In other instances, the user 102 may wish to see the primary content 108 as soon as it is available.

Block 1002 presents the introductory content 106 before presentation of primary content 108. As described above, the primary content 108 may comprise audio and video subject to a DRM scheme and the introductory content 106 may comprise one or more of audio, video, text, an executable application, and so forth.

Block 1004 may receive a first user input during the presentation of the introductory content 106. For example, the user 102 may press a pause, stop, skip, or other control. These particular user inputs may be designated to trigger particular actions.

Based at least in part on the determination that user input is received by block 1004, block 1006 continues presentation of the introductory content 106. For example, the user 102 activating a pause control may result in the presentation of the introductory content 106 being prolonged, rather than automatically timing out and being replaced by the primary content 108.

Block 1008 stores the user input. In some implementations this information may be indicative of user approval of the introductory content 106. For example, activation of the pause control may indicate that the introductory content 106 was of sufficient interest that the user 102 wished to experience more of it.

Block 1010 suspends presentation of the primary content 108. In some implementations, additional blocks may, upon receipt of a second user input, transition from the presentation of the introductory content 106 to the primary content 108 and discontinue presentation of the introductory content 106. Continuing the example above, the user 102 may continue to experience the introductory content 106 until the user 102 activates the pause control a second time.

Returning to block 1004, when no user input is received during the presentation of the introductory content 106, the process may proceed to block 1012. Block 1012 presents the primary content 108 when available. Block 1014 may then discontinue presentation of the introductory content 106. In one implementation once the primary content 108 is decrypted and ready for presentation, presentation of the introductory content 106 may be terminated immediately. In another implementation such as described above, the introductory content 106 and the primary content 108 may be presented contemporaneously for some period of time. In some implementations, the process may include block 1016 which stores information indicative of the absence of user input. This absence of user input may be indicative of a lack of interest on the part of the user 102 with respect to the introductory content 106.

Figure 11:
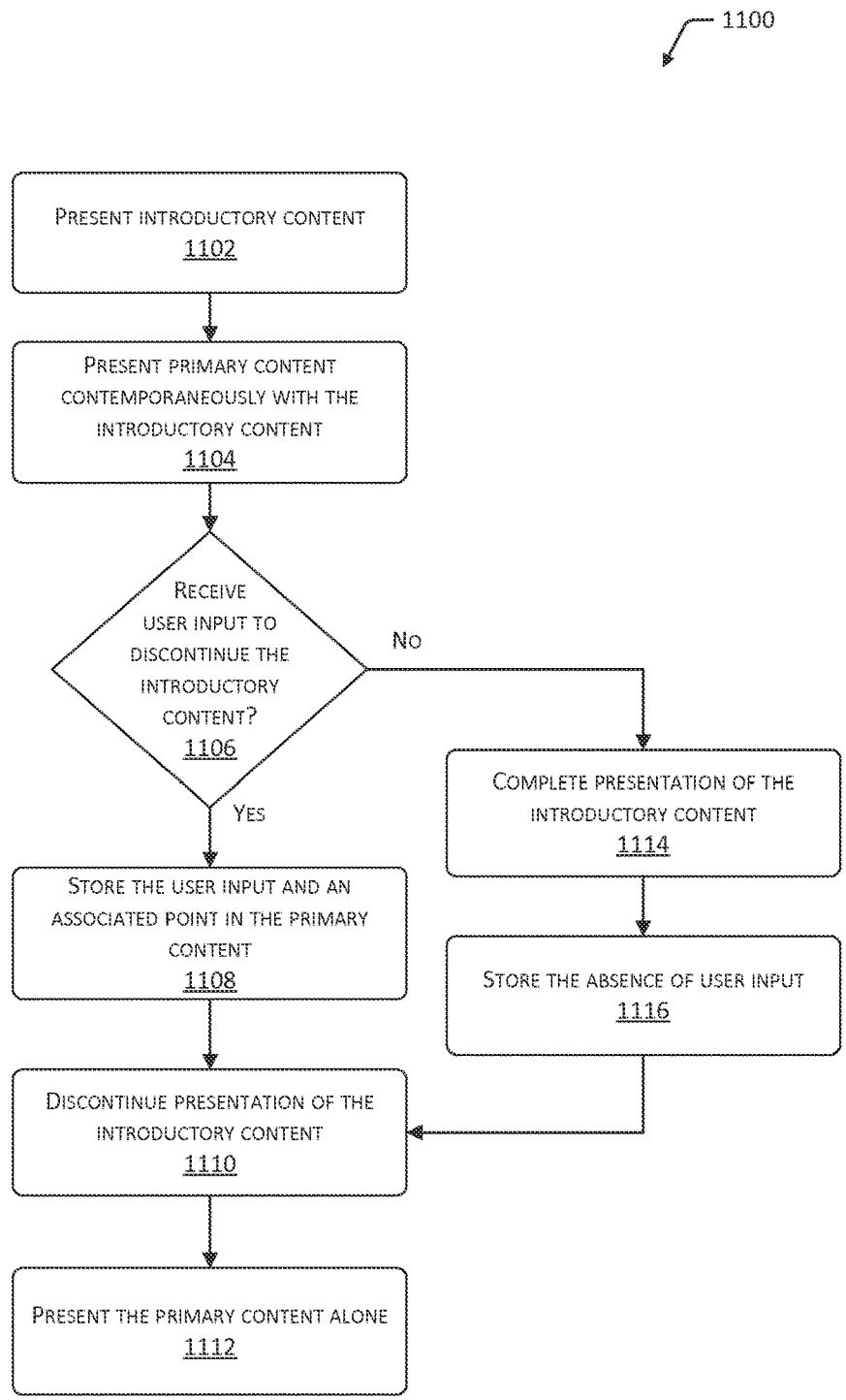
FIG. 11 is a flow diagram of a process of gathering user input associated with the introductory content to determine a point of interest in the primary content.

FIG. 11 is a flow diagram 1100 of a process of gathering user input associated with the introductory content 106 to determine a point of interest 510 in the primary content 108. As described above with respect to FIGS. 1 and 5, information about when the user 102 chooses to discontinue presentation of the introductory content 106 may be used to determine a corresponding point of interest 510 in the primary content 108.

Block 1102 presents the introductory content 106. For example, the display device and the speakers of the user device 104 may present a video clip 312. Block 1104 presents primary content 108 contemporaneously with at least a portion of the introductory content 106 on the user device 104. For example, as depicted in FIG. 1, the presented introductory content 114 and the presented primary content 116 may be shown at the same time on the display device. The introductory content 106 and the primary content 108 may not be presented for identical periods of time. For example, the introductory content 106 may be presented first, followed by the primary content 108 when the primary content 108 becomes available.

Block 1106 determines when user input is received during the presentation of the introductory content 106. When user input is received, the process may proceed to block 1108. The user input may be indicative of a command to discontinue the presentation of the introductory content 106. For example, the user 102 may activate the skip intro 506 control on the remote control 118.

Block 1108 stores the user input and an associated point in the primary content 108. For example, should the user 102 activate the skip intro 506 control at 2:37 elapsed time of the presentation of the primary content 108, the associated point would be at 2:37. In some implementations, the user input, the associated point, or both, may be provided to the server 112. The server 112 may be configured to determine a definitive point of interest in the primary content 108 based at least in part on one or more of the associated points. This is discussed in more detail below with regard to FIG. 12.

Block 1110 discontinues presentation of the introductory content 106. Block 1112 presents the primary content 108 alone, that is, without the introductory content 106. In some implementations a transition may be applied during or after the discontinuation of the block 1110.

Returning to block 1106, when no user input is received, the process proceeds to block 1114. Block 1114 completes presentation of the introductory content 106. In some implementations, the process may include block 1116 which stores the absence of user input to discontinue the presentation of the introductory content 106. This absence of user input may be indicative of interest on the part of the user 102 with respect to the introductory content 106, lack of interest on the part of the user 102 with respect to a portion of the primary content 108 presented, or both. Upon completion of the introductory content 106, the process may proceed to block 1110.

Figure 12:
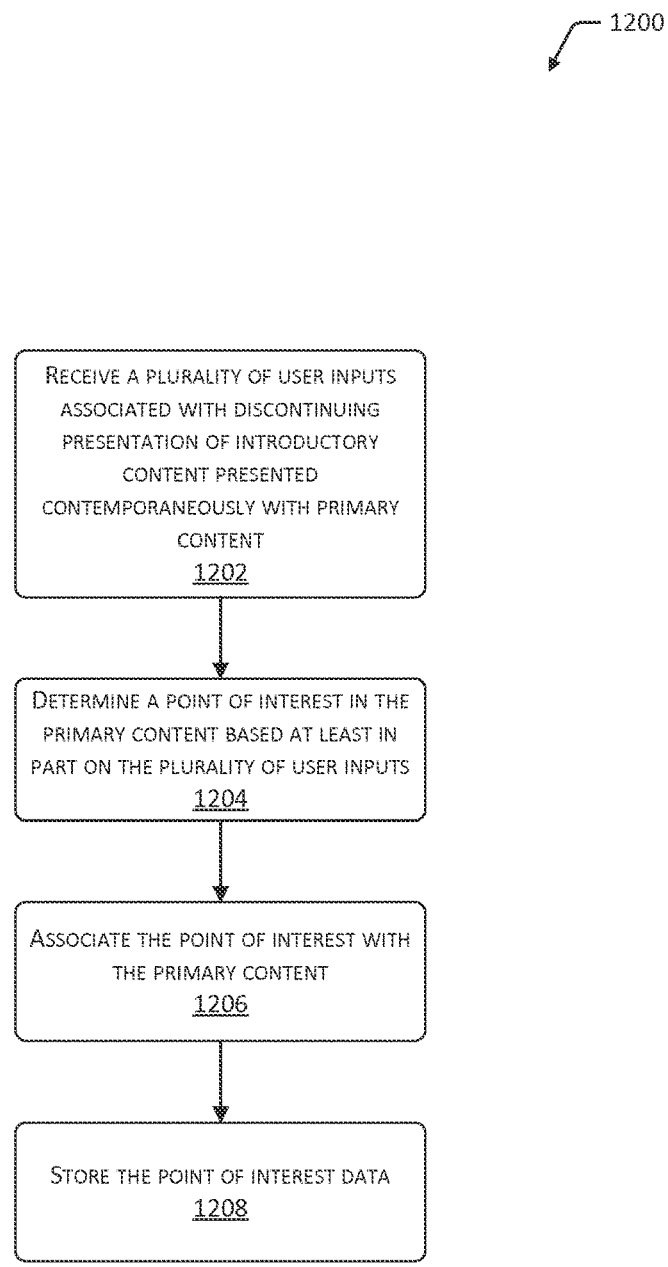
FIG. 12 is a flow diagram of a process for determining a point of interest in the primary content based on a plurality of user inputs.

FIG. 12 is a flow diagram 1200 of a process of determining the definitive point of interest in the primary content 108 based on a plurality of user input. The definitive point of interest may be considered the point in the primary content 108 at which a portion of the content is of direct and immediate interest to the users 102. For example, the opening scene in a movie.

Block 1202 receives a plurality of user inputs associated with discontinuing presentation of introductory content 106 presented contemporaneously with the primary content 108. For example, the point of interest 510 data received from a plurality of the user devices 104 after users 102 have selected to discontinue presentation of introductory content 106 playing at the same time in favor of primary content 108.

Block 1204 determines a definitive point of interest in the primary content 108 based at least in part on the plurality of user inputs. For example, where the plurality of user inputs comprises data from 250 different users 102 which is centered on 2:37 elapsed time in the primary content 108, analysis may result in that time being the definitive point of interest. In some implementations the definitive point of interest may change over time. For example, a particularly amusing studio vanity card may result in the definitive point of interest shifting to 1:17 when that card is presented. The point of interest 510 data and the definitive point of interest may comprise a time, frame count, byte count, or other identifier specifying a particular point during presentation of the primary content 108.

Block 1206 associates the definitive point of interest with the primary content 108. For example, the definitive point of interest in the movie "Burnt Sage" may be associated with versions of that movie in high definition, standard definition, and so forth.

Block 1208 stores the definitive point of interest and the association. For example, the point of interest of 2:37 elapsed time may be associated with the high definition and standard definition versions of the movie "Burnt Sage."

In some implementations, an additional block may send data indicative of the definitive point of interest to one or more user devices 104. Using this data about the definitive point of interest, users 102 viewing the associated primary content 108 may choose to jump to the definitive point of interest when the primary content 108 is presented. This jump may be manually initiated by the user 102, or may have been previously configured to occur automatically without further user 102 intervention.

In addition to use by the presentation module 124, in some implementations the server 112 providing the primary content 108 may begin presentation at the definitive point of interest. In this implementation, a first block may receive a request for the primary content 108 associated with the definitive point of interest. A second block may then begin streaming or presentation of the primary content 108 at the definitive point of interest.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

The computer readable storage medium can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations.

Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A computer-implemented method for utilizing processing devices of a computerized system, the computer-implemented method comprising:
   receiving a request to play primary content with a user device;
   in response to the receiving, preparing the primary content for playing during a first time period wherein the primary content is not ready to play;
   during the first time period, accessing one or more introductory content selection parameters to determine introductory content to present;
   during the first time period, playing the determined introductory content to the user device;
   determining that the primary content is available for playing;
   retrieving a point of interest from a datastore, the point of interest defining a point in the primary content that other users have selected to begin playing of the primary content, the point of interest specified by a time stamp of the point in the primary content to begin playing;
   detecting receipt of user input; and
   in response to the user input, discontinuing the introductory content and playing the primary content beginning at the point of interest specified by the time stamp, the discontinuing and the playing performed during a second time period subsequent to the first time period.

2. The method of claim 1, wherein the one or more introductory content selection parameters comprise one or more of:
   content consumption history associated with a user account, or
   demographic of a user associated with the user account.

3. The method of claim 1, wherein the introductory content comprises an interactive application configured to respond to the user input.

4. A computer-implemented method for utilizing processing resource devices of a computerized system, the computer-implemented method comprising:
   identifying primary content for playing on a user interface of a user device in response to a request to play the primary content;
   during a first time period wherein the primary content is not ready to play:
      preparing the primary content for playing,
      accessing introductory content selection parameters to determine introductory content to play;
      presenting a user interface comprising one or more user interface elements for controlling playing of the introductory content;
      receiving, via a network connection, the introductory content using the user interface; and
      playing, on the user interface, the introductory content determined based on the introductory content selection parameters;
   determining that the primary content is available for playing;
   retrieving a point of interest from a datastore, the point of interest defining a point in the primary content that other users have selected to begin playing of the primary content, the point of interest specified by a time stamp of the point in the primary content to begin playing;
   detecting receipt of user input; and
   in response to the user input, discontinuing the introductory content and playing the primary content beginning at the point of interest, wherein the discontinuing the introductory content and the playing the primary content are performed during a second time period subsequent to the first time period.

5. The method of claim 4, wherein the user input comprises one or more of a command to start initial presentation, a command to pause presentation, a command to fast forward in the introductory content, a command to rewind in the introductory content, or a command to stop presenting the introductory content.

6. The method of claim 4, wherein the introductory content comprises a game application configured to receive the user input and featuring one or more creative elements from the primary content.

7. The method of claim 4, wherein a duration of the introductory content is less than a duration of the primary content.

8. The method of claim 4, wherein the introductory content comprises two or more of:
   a still image derived from the primary content,
   text based at least in part on the primary content,
   a slideshow derived from the primary content,
   audio data derived from the primary content,
   video data derived from a portion of the primary content, or
   an animation featuring one or more elements from the primary content.

9. The method of claim 4, wherein the primary content is presented contemporaneously with at least a portion of the introductory content by:
   presenting the at least a portion of the introductory content within a display frame; and
   presenting the primary content within a same display frame as the at least a portion of the introductory content.

10. The method of claim 4, wherein the primary content comprises audio data and video data.

11. The method of claim 4, wherein the introductory content comprises an executable application for accessing a social networking service and further wherein the introductory content is selected based at least in part on a demographic of a user.

12. A system comprising:
   at least one user input device;
   at least one memory storing computer-executable instructions; and
   at least one processor configured to couple to the at least one user input device, access the at least one memory, and execute the computer-executable instructions to:
      receive a request to play primary content with a user device;
      in response to the request, access introductory content selection parameters to determine introductory content for playing on the user device;
      during a first time period wherein the primary content is not ready to play, prepare the primary content for playing;
      during the first time period, play the introductory content on the user device;
      determine that the primary content is available for playing;
      retrieve a point of interest from a datastore, the point of interest defining a point in the primary content that other users have selected to begin playing of the primary content, the point of interest specified by a time stamp of the point in the primary content to begin playing;
      receive user input; and
      in response to the user input, discontinue the introductory content and begin playing the primary content beginning at the point of interest, wherein the discontinuing the introductory content and the playing the primary content are performed during a second time period subsequent to the first time period.

13. The system of claim 12, wherein the primary content comprises audio and video subject to a digital rights management scheme and the introductory content comprises an executable application.

14. The system of claim 12, wherein the point of interest is based on a plurality of user inputs selecting to discontinue presentation of the introductory content and to present the primary content.

15. A system comprising:
   at least one user input device;
   at least one memory storing computer-executable instructions; and
   at least one processor configured to couple to the user input device, access the at least one memory, and execute the computer-executable instructions to:
      receive a request to play primary content with a user device;
      in response to the request, access introductory content selection parameters to determine introductory content for playing on the user device;
      during a first time period wherein the primary content is not ready to play, prepare the primary content for playing;
      during the first time period, play the determined introductory content on the user device;
      determine that the primary content is available for playing;
      retrieve a point of interest from a datastore, the point of interest defining a point in the primary content that other users have selected to begin playing of the primary content, the point of interest specified by a time stamp of the point in the primary content to begin playing;
      receive user input during playing of the introductory content; and
      based at least in part on an ongoing determination that the user input is received, cause playing of the introductory content to be discontinued and cause the playing of the primary content beginning at the point of interest, wherein the discontinuing of the introductory content and the playing of the primary content are performed during a second time period subsequent to the first time period.

16. The system of claim 15, wherein the point of interest is based on a plurality of user inputs selecting to discontinue presentation of the introductory content and to present the primary content at the point of interest.

17. A computer-implemented method for utilizing processing resource devices of a computerized system, the computer-implemented method comprising:
   identifying primary content requested by a plurality of devices;
   in response to a request, accessing introductory content selection parameters to determine introductory content to present;
   based on the introductory content selection parameters, identifying the introductory content for playing on the plurality of devices;
   during a first time period wherein the primary content is not ready to play, preparing the primary content for playing on the plurality of devices;
   during the first time period, playing the identified introductory content at the plurality of devices;
   determining that the primary content is available for playing at the plurality of devices;

retrieving a point of interest from a datastore, the point of interest defining a point in the primary content that other users have selected to begin playing of the primary content, the point of interest specified by a time stamp of the point in the primary content to begin playing;

detecting receipt of user input from at least one of the plurality of devices; and in response to the user input from the at least one of the plurality of devices, discontinuing the playing of the introductory content on the at least one of the plurality of devices and begin playing the primary content on the at least one of the plurality of devices starting from the point of interest in the primary content for the at least one of the plurality of devices.

18. The method of claim 17, wherein the time stamp associated with the point of interest further comprises a time, frame count, byte count, or other identifier specifying a particular point in the primary content.

19. The method of claim 17, further comprising sending data indicative of the point of interest to one or more of the plurality of devices.

20. The method of claim 17, further comprising:
wherein the introductory content comprises at least one of video data, audio data, animation data, still images, or text.

* * * * *

UNITED STATES PATENT AND TRADEMARK OFFICE
CERTIFICATE OF CORRECTION

PATENT NO. : 10,387,537 B1
APPLICATION NO. : 13/717833
DATED : August 20, 2019
INVENTOR(S) : Raeber et al.

Page 1 of 1

It is certified that error appears in the above-identified patent and that said Letters Patent is hereby corrected as shown below:

On the Title Page

Add Missing References under "(56) References Cited":
--2006/020962 Stark et al.
2008/284910 Erskine et al.
2012/011545 Doets et al.
2014/095996 Hogben et al.--

Signed and Sealed this
Fifth Day of November, 2019

Andrei Iancu
*Director of the United States Patent and Trademark Office*